Jan. 1, 1952     F. J. HILLMAN     2,580,680
SAFETY GUARD FOR POWER-DRIVEN PIPE TONGS
Filed Dec. 29, 1947
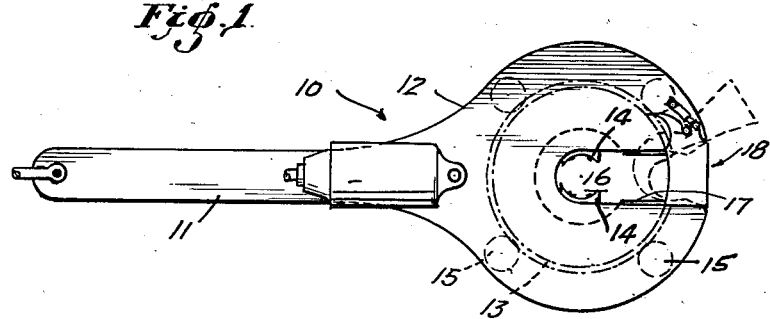
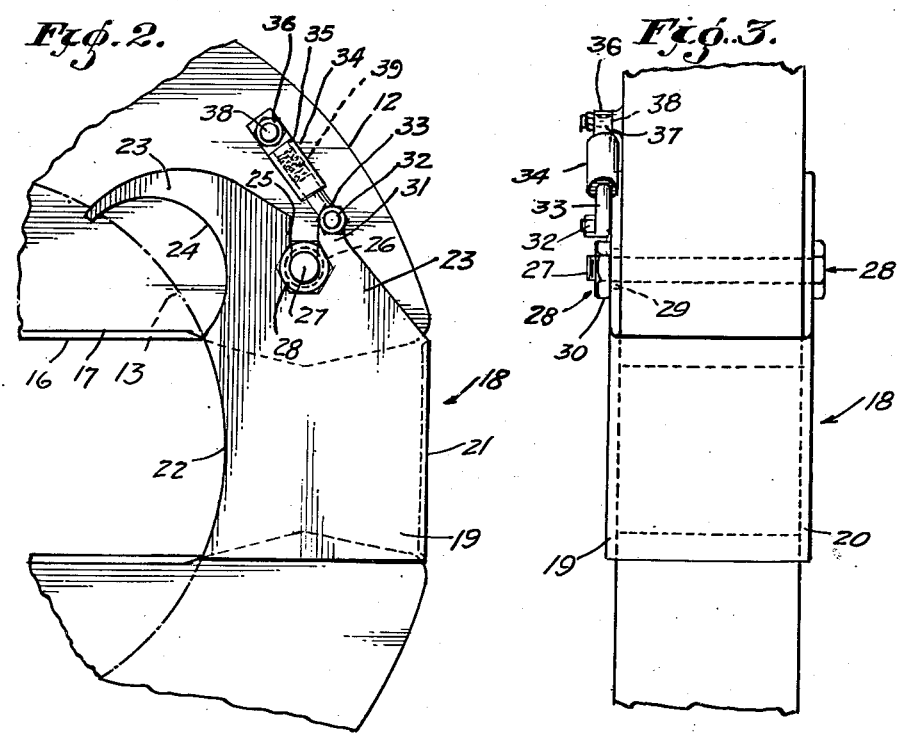
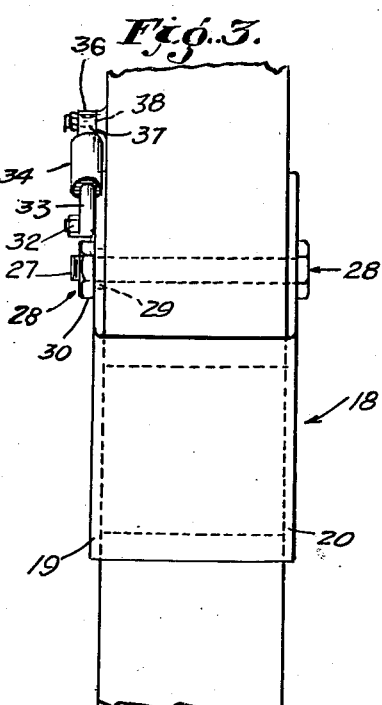
INVENTOR.
FRED J. HILLMAN.
BY James M. Abbett
ATTY.

Patented Jan. 1, 1952

2,580,680

UNITED STATES PATENT OFFICE 2,580,680

SAFETY GUARD FOR POWER-DRIVEN PIPE TONGS

Fred J. Hillman, Bakersfield, Calif., assignor to Hillman-Kelley, Los Angeles, Calif., a partnership Application December 29, 1947, Serial No. 794,240

10 Claims. (Cl. 81—53)

This invention relates to power driven pipe tongs and the like as used in oil well operations, and particularly pertains to a safety guard for power driven pipe tongs.

In oil well operations it is common practice to suspend a drill bit at the lower end of a length of jointed drill pipe when the well is being drilled and to suspend pumping mechanism at the lower end of a jointed tubing string when the well is being pumped. In both instances the sections of pipe or tubing string are connected by threaded tool joint members comprising a box and a pin which must be screwed together or unscrewed as the string of pipe is assembled or disassembled. Various types of pipe tongs are used for this purpose and of recent date power driven pipe tongs are provided such as are generally indicated in Lange et al. Patent No. 2,305,624. In structures of this type the tongs include a housing having an open radial slot or throat leading to the center portion of the tongs and a rotary gear member mounted within the housing to carry jaws by which pipe or tubing is gripped. The gear is formed with a radial slot leading to the center of the gear and when the slots of the housing and the gear are in register a pipe or tubing member may pass through the registering slots to the center of the tongs, after which the gear is rotated. It is obvious that as the gear rotates the slots in the gear and the housing will momentarily register, after which the walls of the slots will act scissors-like and the teeth of the gear will pass across the slot in the housing, with the result that if a limb of a workman's body should be placed accidentally in the slotted opening or throat of the housing it would be torn by the rotating gear. It is desirable, therefore, to provide conveniently operating safety means for preventing such an accident, and it is the principal object of the present invention to provide a safety guard for rotary tongs which may automatically open and close incident to the introduction or removal of a pipe from the tongs.

The present invention contemplates a guard structure which may be mounted upon a housing of a set of power tongs, said guard being pivoted at one side of the slotted radial opening in the housing and being mounted in a manner to cause the guard to swing to and from a closed position automatically and incident to the passage of a pipe or tubing through the throat represented by the slotted opening.

The invention is illustrated by way of example in the accompanying drawing in which:

Figure 1 is a view of power tongs and indicates the safety guard mounted in position thereon.

Fig. 2 is an enlarged fragmentary plan view showing the construction of the safety guard.

Fig. 3 is a view in end elevation showing other details of the guard structure.

Referring more particularly to the drawings, 10 indicates power tongs. This structure comprises a handle structure 11 and a housing structure 12. The housing accommodates a gear plate 13 carrying gripping jaws 14. The gripping jaws are moved toward and away from their gripping positions by various mechanisms which are not a part of the present invention. The housing carries means, such as rollers 15, to support the gear plate 13 so that it may rotate around a central axis which is coincident with the center of the housing. The housing is formed with a throat 16 which extends radially to a center opening designed to accommodate a pipe or tubing to be gripped or rotated. The gear plate 13 is formed with a slotted throat 17 which may register with the throat 16 at a point in the rotation of the gear plate 13 around the common axis of the plate and the housing.

The present invention is concerned with a safety guard 18 which may be moved to an obstructing position across the end of the throat 16 as well as across a top and bottom portion of the throat of sufficient length to form a guard over the geared circumference of the gear plate 13. The guard comprises upper and lower plates 19 and 20 which are parallel to each other and which are of a radial width substantially equal to the length of the throat portions comprising the throat 16 formed in the housing. The outermost edges of the plates are substantially straight and represent a chord of a circle substantially agreeing with the outside circumference of the housing, being joined by a flange or web as indicated at 21. The inner edges 22 of the plates are arcuate and are struck from a radius concentric with the center of the housing. The plates 19 and 20 are of a length to bridge the throat 16 and to move adjacent or rest against the faces of the housing along opposite sides of the throat. Each of the plates is also provided with an extension arm 23. These arms are arcuate and have an arcuate face 24 which agrees substantially in radius with the radius of the pipe which is to be engaged by the tongs. The arms 23 are formed on the ends of the plates 19 and 20 and the arms 23 are of such a configuration and arrangement that they will swing into a position across the throat 16, as indicated by dotted lines in Fig. 1 of the drawing, after the safety guard 18 has swung to an open position. In order to mount the safety guard pivotally upon the housing 12 a slot 25 is formed in the back edge of each of the plates at a point contiguous to the base of each of the arms 23. The slot 25 is formed at its inner end with an enlarged circular opening 26 which is of greater diameter than the entering throat of the slot. A pivot bolt 27 extends through the housing and centrally of each of the circular openings 26. The bolt receives nuts 28 which are each formed with an extension in the form of a cylindrical lip 29. The lip 29 extends into the circular opening 26 of the corresponding slot 25 and provides a circular bearing surface around which the safety guard swings. The nuts are each also provided with an enlarged flange 30 which holds the guard in place. Formed as a part of the plate 19 and extending outwardly from the outer edge thereof at a point adjacent to its slot 25 is an ear 31. The ear 31 carries a cap screw 32 which acts as a pivotal connection for one end of a spring biased plunger 33. The spring biased plunger 33 reciprocates within a tubular spring housing 34. The opposite end of the housing 34 from that receiving the plunger is provided with a block 35 which is fixed within the end of the spring housing and is formed with an extension 36 having an opening 37 through it to receive a cap screw 38. The cap screw 38 is fastened to the housing and thus provides a pivotal mounting for the tubular spring housing 34. Mounted within the housing 34 and disposed between the plunger 33 and the block 35 is an expansion spring 39 which tends to urge the plunger 33 toward its outermost position. As will be seen in Fig. 2 of the drawing the plane of the axes of the cap screws 32 and 38 is not coincident with the plane of the axes of the pivot bolt 27 and the cap screw 38. Thus, when the safety guard 18 is closed, as indicated by solid lines in Fig. 1 of the drawing, the cap screw 32 will be positioned outwardly of the plane of the bolt 27 and the cap screw 38, and the spring 39 will tend to hold the safety guard in its closed position. When the safety guard has been swung to its open position, as indicated by dotted lines in Fig. 1 of the drawing, the cap screw 32 will swing around the axis of the bolt 27 along an arcuate path to an off-center position upon the opposite side of the center plane of the bolt 27 and the cap screw 38. This will insure that the safety guard 18 will be held yieldably in its open position in which the edges 22 extend angularly from the periphery of the housing and serve as a guide means aiding entry of a pipe into the throat 16. In order to effectually close the end of the housing throat 16 when the safety guard is in its closed position, the plates 19 and 20 are connected by the aforesaid flange or web 21 which is of a width substantially equal to the width of the outer end of the housing throat 16 and which extends entirely from plate 19 to plate 20.

In operation of the present invention the safety guard 18 is mounted upon the housing 12 by the bolt 27, being held in position by the nuts 28. It is obvious that the narrow slots 25 terminating in the circular openings 26 make it possible for the safety guard to be detached quickly from the structure by loosening the nuts 28 until their cylindrical lips 29 are out of register with the circular openings 26. The guard may then be withdrawn from its position on the bolt 27 due to the fact that the diameter of the bolt 27 is less than the width of the slots 25. When the safety guard 18 is in the dotted line position as shown in Fig. 1, it will be evident that the arms 23 will stand in an obstructing position across the throat 16 of the housing. In this position the arms may be engaged by a pipe or tubing upon which the tongs are placed and the pipe or tubing will seat within the arcuate portion 24 of the arms. While in this position the safety guard is held yieldably by the spring 39 acting between the block 35 and the plunger 33. In this position the arms 23 will encounter a pipe as the tongs structure is moved toward the pipe and the pipe passes through the throat 16 and to the center of the housing 12. It will be understood of course that at this time the throat 17 of the gear plate 13 will be in register with the throat 16 of the housing. Continued movement of the tongs structure toward the pipe will cause the safety guard 18 to swing from its dotted line position as shown in Fig. 1 to the solid line position shown in Figs. 1 and 2. In this transition the cap screw 32 at the outer end of the spring plunger 33 will pass around dead-center with relation to the bolt 27 and the cap screw 38 so that the plunger may move outwardly under the influence of the spring 39 and will snap and hold the safety guard 18 into and in the position shown in Fig. 2. When it is necessary to remove the tongs from an embracing position around the pipe they are manipulated to place the throat 17 of the gear plate 13 into register with the throat 16 of the housing 12. The tongs may then be withdrawn from their operating position around the pipe, and as this is accomplished the pipe will strike the edges 22 of the plates 19 and 20 of the safety guard and will cause the safety guard to swing outwardly to an unobstructing position relative to the throat and to the dotted line position shown in Fig. 1 of the drawings. When occasion should require that the safety guard should be removed or replaced this may be easily accomplished by unfastening the cap screw 38 and loosening the nuts 28, after which the structure may be easily withdrawn from its position.

It will thus be seen that the safety guard here shown is simple in construction, that it may be easily mounted upon the housing of power tongs or removed therefrom, and that it will act automatically to dispose the guard in a shielding position with relation to moving parts of a tongs structure incident to the movement of a pipe to a gripping position within the housing.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. In combination with power driven pipe tongs having a housing formed with a throat to be traversed by a pipe as it assumes a position to be gripped at the center of the housing, said housing providing upper and lower walls enclosing a rotary member carrying pipe gripping means and being formed with a throat which may register with the throat in the housing to accommodate the pipe to be gripped: a safety guard comprising a channel-shaped guard member comprising plates joined by a web and adapted to span the throat of the housing with said plates overlapping said upper and lower walls while the web of the guard closes the end of the throat; means pivotally mounting the safety guard upon the housing whereby it may swing outwardly to an unobstructing position;

and means between the housing and the guard to temporarily hold the guard in either of its extreme positions.

2. The structure of claim 1 including spring means secured to the housing at one end and to the safety guard at its opposite end, the point of attachment to the safety guard being off-center relative to a line joining said one end and said pivotally mounting means whereby when the safety guard is moved from one extreme position to the other the safety guard will be yieldably urged and held at such other extreme position.

3. In combination with power driven pipe tongs having a housing formed with a throat to be traversed by a pipe as it assumes a position to be gripped at the center of the housing, said housing providing upper and lower walls enclosing a rotary member carrying pipe gripping means and being formed with a throat which may register with the throat in the housing to accommodate the pipe to be gripped: a safety guard comprising a channel-shaped guard member comprising plates joined by a web and adapted to span the throat of the housing with said plates overlapping said upper and lower walls while the web of the guard closes the end of the throat; a threaded member extending from the face of the housing; walls defining an opening through the contiguous plate of the safety guard, said opening having a slotted throat which may be traversed by said threaded member, the slotted throat terminating in an enlarged circular opening; and a nut mounted on said threaded member and having an annular extension to extend downwardly into said enlarged circular opening to provide a bearing around which said safety guard may rotate.

4. In a power-operated tong structure of the type having a housing providing upper and lower faces with a pipe-receiving throat extending therethrough and a power-driven rotary member within said housing and carrying a pipe-gripping means, said rotary member being formed with a throat adapted to register with said pipe-receiving throat, the side walls of said throats acting scissors-like when said throat of said rotary member is turned out of its registering relationship with said pipe-receiving throat to represent a hazard for the arms and fingers of a person, a safety guard structure for such pipe-receiving throat comprising: a guard member; a pivot means for pivoting said guard member near one side wall of said pipe-receiving throat to swing in a plane substantially parallel to the plane of turning of said rotary member and from an unobstructing position permitting a pipe to pass through said pipe-receiving throat to an obstructing position extending across said pipe-receiving throat to guard against said hazard; and an arm on said guard member extending into the path of inward movement of said pipe to be contacted by said pipe during such inward movement to swing said guard member automatically into its obstructing position, said guard member providing an inner face engageable by said pipe during withdrawal from said pipe-receiving throat to swing said guard member into its unobstructing position.

5. A tong structure as defined in claim 4 in which said guard member includes a flange substantially closing the open end of said pipe-receiving throat when said guard member is in said obstructing position, said flange extending in a plane substantially at right angles to the plane in which said guard member swings.

6. A tong structure as defined in claim 4 in which said housing provides a stop means adjacent the other side wall of the pipe-receiving throat opposite the side wall adjacent which said pivot means is disposed, and in which said guard member swings to rest against said stop means when in obstructing position but is otherwise free of any locking engagement with said stop means of a nature to lock said guard member fixedly against pivoting toward its unobstructing position.

7. A tong structure as defined in claim 6 including a spring-operated toggle mechanism disposed operatively between said housing and said guard member to hold the latter resiliently in contact with said stop means when said guard member is in obstructing position, said mechanism including means for resiliently urging said guard member toward its unobstructing position as such position is neared.

8. In a power-operated tong structure of the type having a housing providing upper and lower faces with a pipe-receiving throat extending therethrough and a power-driven rotary member within said housing and carrying pipe-gripping means, said rotary member being formed with a throat adapted to register with said pipe-receiving throat, the side walls of said throats acting scissors-like when said throat of said rotary member is turned out of its registering relationship with said pipe-receiving throat to represent a hazard for the arms and fingers of a person, a safety guard structure for such pipe-receiving throat comprising: a guard member including a plate; and pivot means near one side wall of said pipe-receiving throat and providing a pivot axis substantially perpendicular to one of said faces of said housing for pivoting said guard member to swing said plate substantially in its own plane and in a plane adjacent and parallel to said one of said faces of said housing from an unobstructing position permitting a pipe to pass through said pipe-receiving throat to an obstructing position in which said plate extends across said pipe-receiving throat to guard against said hazard, said plate providing an outer edge lying across said pipe-receiving throat and substantially flush with the periphery of said housing when said plate is in obstructing position, said plate providing an inner edge engageable by said pipe during its withdrawal from said pipe-receiving throat to swing said plate to its unobstructing position.

9. In a power-operated tong structure of the type having a housing providing upper and lower faces with a pipe-receiving throat extending therethrough and a power-driven rotary member within said housing and carrying pipe-gripping means, said rotary member being formed with a throat adapted to register with said pipe-receiving throat, the side walls of said throats acting scissors-like when said throat of said rotatry member is turned out of its registering relationship with said pipe-receiving throat to represent a hazard for the arms and fingers of a person, a safety guard structure for such pipe-receiving throat comprising: a guard member; and pivot means near one side wall of said pipe-receiving throat for pivoting said guard member to swing adjacent and in a plane parallel to one of said faces of said housing from an unobstructing position permitting a pipe to pass through said pipe-receiving throat to an obstructing position in which said guard member extends across said pipe-receiving throat to guard against said hazard, said guard member providing an outer edge lying across the outermost end of said pipe-receiving throat in blocking relationship therewith when said guard member is in its obstructing position, said guard member including an inner edge engageable by said pipe during its withdrawal from said pipe-receiving throat to swing said guard member into its unobstructing position, said inner edge extending outwardly and angularly from the periphery of said housing when said guard member is in its unobstructing position to aid in subsequently guiding a pipe into said pipe-receiving throat.

10. A tong structure as defined in claim 9 including toggle means for yieldingly urging said guard member toward its unobstructing and obstructing positions from an intermediate dead-center position, said toggle means including a spring-operated mechanism and means for operatively connecting opposite ends thereof to said guard member and to said housing, and in which said guard member includes an arm extending into the path of inward movement of said pipe to be contacted by said pipe during such inward movement to swing said guard member automatically into its obstructing position due to such inward pipe movement and with a snap action exerted by said toggle means on said guard member.

FRED J. HILLMAN.

REFERENCES CITED

The following references are of record in the file of this patent:

UNITED STATES PATENTS

| Number | Name | Date |
|---|---|---|
| 1,764,124 | Smith | June 17, 1930 |
| 1,802,210 | Kinser | Apr. 21, 1931 |
| 1,890,213 | Cameron et al. | Dec. 6, 1932 |
| 1,921,281 | Carlson | Aug. 8, 1933 |
| 2,305,624 | Lange et al. | Dec. 22, 1942 |